(12) United States Patent
Treat

(10) Patent No.: US 7,317,275 B2
(45) Date of Patent: Jan. 8, 2008

(54) HARMONIC PROPULSION AND HARMONIC CONTROLLER

(75) Inventor: Michael R. Treat, New York, NY (US)

(73) Assignee: The Trustees of Columbia University in the City of New York, New York, NY (US)

(*) Notice: Subject to any disclaimer, the term of this patent is extended or adjusted under 35 U.S.C. 154(b) by 0 days.

(21) Appl. No.: 10/536,479

(22) PCT Filed: Sep. 30, 2004

(86) PCT No.: PCT/US2004/032702

§ 371 (c)(1),
(2), (4) Date: Oct. 3, 2005

(65) Prior Publication Data

US 2006/0125336 A1   Jun. 15, 2006

(51) Int. Cl.
*H01L 41/09* (2006.01)
*H02N 2/04* (2006.01)

(52) U.S. Cl. .................. 310/328; 310/323.01; 310/330

(58) Field of Classification Search ........... 310/323.01, 310/323.02, 323.03, 323.16, 313.17, 323.18, 310/328–332
See application file for complete search history.

(56) References Cited

U.S. PATENT DOCUMENTS

| 4,207,872 | A | | 6/1980 | Meiri et al. |
|---|---|---|---|---|
| 4,325,264 | A | | 4/1982 | Sashida |
| 4,453,103 | A | | 6/1984 | Vishnevsky et al. |
| 4,857,791 | A | * | 8/1989 | Uchino et al. ............... 310/321 |
| 4,953,413 | A | * | 9/1990 | Iwata et al. ................... 74/155 |
| 5,134,334 | A | * | 7/1992 | Onishi et al. ........... 310/323.16 |
| 5,140,976 | A | | 8/1992 | Cheng |
| 5,216,313 | A | | 6/1993 | Ohinishi et al. |
| 5,350,966 | A | * | 9/1994 | Culp .......................... 310/328 |
| 5,554,914 | A | | 9/1996 | Miyazawa |
| 5,595,565 | A | | 1/1997 | Treat et al. |
| 5,681,260 | A | | 10/1997 | Ueda et al. |
| 6,051,912 | A | | 4/2000 | Gonda |
| 6,072,266 | A | * | 6/2000 | Tomikawa ............. 310/323.02 |
| 6,188,161 | B1 | * | 2/2001 | Yoshida et al. ............. 310/328 |
| 6,217,533 | B1 | | 4/2001 | McCambridge |
| 7,045,932 | B2 | * | 5/2006 | Xu et al. ............... 310/323.17 |
| 2004/0232807 | A1 | * | 11/2004 | Pelrine et al. ............... 310/800 |

FOREIGN PATENT DOCUMENTS

JP         404299079 A     10/1992

* cited by examiner

*Primary Examiner*—Darren Schuberg
*Assistant Examiner*—Derek Rosenau
(74) *Attorney, Agent, or Firm*—Wolf, Block, Schorr & Solis-Cohen LLP; William H. Dippert

(57) ABSTRACT

A device and method for propelling objects using periodic or harmonic vibrations is described. The device comprises a flexible substrate or surface and a source of vibrational energy that is applied to the substrate or surface. Specific embodiments include a device which can move along a flat surface, which can climb a smooth vertical or slanted wall, which can move along a ceiling while suspended upside down, which can climb up a smooth hollow tube, or which can move through liquids.

22 Claims, 2 Drawing Sheets

HARMONIC PROPULSION AND HARMONIC CONTROLLER

CROSS-REFERENCE TO RELATED APPLICATION

This application is based upon co-pending, commonly assigned U.S. provisional patent application Ser. No. 60/507,667, filed Sep. 30, 2003, which is incorporated herein in its entirety.

FIELD OF THE INVENTION

The present invention generally relates to a method for moving objects. The present invention specifically is directed to propelling objects by using periodic or harmonic vibrations. Embodiments of the present invention include a method to move an object along a flat surface (translating horizontally), to move an object up a smooth vertical wall (climbing vertically), to move an object along a ceiling while the object is upside down relative to its position in normal horizontal translation, to climb inside a smooth hollow tube, to swim through liquids, and to rotate. The present invention is also directed to devices which execute the various movements.

BACKGROUND OF THE INVENTION

Historically, the usual means for propelling objects along the ground has been by employing wheels. Typically at least one wheel is made to move by means of a motor. The wheel so driven exerts force on the ground as it turns, and the object to which the wheel is attached will move forward. A common example of such a method is that of propulsion of automobiles. Another means for propelling or moving objects is a propeller. A propeller will push against a fluid in which an object is immersed and thereby propel the object forward. Simple examples would be the motion of an airplane propeller against the fluid air or the motion of a boat propeller against the fluid water. A different means of propulsion is inertial reaction in which mass is expelled in one direction, causing an object expelling the mass to move in the opposite direction, by virtue of conservation of linear momentum. A simple example of such motion would be the motion of a rocket or a jet airplane.

Although there are numerous examples of the use of wheels, propellers, and reaction engines to impart translation motion, there appear to be relatively few examples of the use of vibrations to induce motion. Of the few vibratory examples, most involve the use of vibrations imparted to the entire surface on which the moving object is travelling. One such example is the use of vibratory conveyor belts to move grain or small parts in manufacturing operations. There is also a toy sports game in which miniature football players are moved along a playing field, which is a sheet of metal, by vibrations to the entire playing field induced by an electromechanical motor (such as a buzzer). However, there are no devices wherein there is a self-contained and mobile source of vibrations that cause an object to move translationally in a directable manner.

OBJECTS OF THE INVENTION

It is an object of the invention to provide a method and device for harmonic propulsion.

It is also an object of the invention to provide a method and device for propelling and/or controlling objects by use of periodic or harmonic vibrations.

It is a further object of the invention to provide a method and device for imparting translational motion to an object.

It is a yet further object of the invention to provide a method and device for imparting translational motion to an object on a surface by vibrating the object to produce harmonic motion and coupling the vibration to the surface in an asymmetric way It is a yet further object of the invention to provide a method and device to move an object along a flat surface, to move an object up a vertical wall, to move an object along a ceiling, to move an object through a smooth hollow tube, to move an object through a liquid or fluid, or to cause an object to rotate.

These and other objects of the invention will become more apparent from the discussion below.

SUMMARY OF THE INVENTION

According to one aspect of the invention, vibratory motion is used to perform the functions of devices described herein, namely, to move along a level surface, to climb up a smooth vertical or slanted wall, to move upside down on a ceiling, or to climb up a hollow tube. Another aspect of the invention comprises a solution to the problem of controlling the direction of such moving devices. Without directional control, the utility of a moving device is much reduced; and, with directional control, the method and device for which is taught by the present invention, it becomes possible to build devices which can be used for exploration of intricate spaces, under either remote control or control based on an on-board set of sensors and decision-making circuits. A device according to the invention is expected to be have various applications. One potential use is in the in the medical field, for example, in or with a partly or wholly self-propelled endoscope or other invasive medical device.

A great advantage of vibratory or harmonic propulsion is that such devices may be very small and simple compared to more conventional devices, such as wheeled devices. This is because this form of propulsion does not require axles, bearings, transmissions, or even wheels, as are needed for wheeled devices. This form of propulsion does not require propellers or jet engines. The present invention requires a system with a source of vibrations and a driving surface, which comes in contact with the surface upon which the device is moving.

Also, unlike wheels or treads (as in a tank), harmonic propulsion can be effected on any or all surfaces of the device, instead of being limited to the aspects of the device (the driving surface of the wheels or treads). Therefore, it becomes very easy using harmonic propulsion to build devices which can, for example, ascend the inside of hollow pipes since the device can obtain propulsion from the entire circumference of the pipe. Also, the surface of vibration can be adjusted as to its stiffness and texture so that the device can move on a great variety of terrain (for example, hard, smooth, dry ground versus softer wet ground). In one embodiment, it is envisioned that this technology will allow for the development of a practical self-propelled endoscope to explore a patient's gastrointestinal tract or another corporeal channel or site.

In its simplicity and with few moving parts, the present invention overcomes the problems of the prior art. The present invention describes a device and method to cause an object to move translationally by impartation of vibrational energy.

One embodiment of the invention is generally directed to imparting translational motion of an object by application of vibrations, preferably harmonic vibrations.

Another embodiment of the invention is a device to effect translational motion that comprises a source of harmonic or periodic mechanical or acoustic vibrations, a vibrating surface whose modes of vibration are excited by the source of vibrations, and a symmetry breaking element.

Another embodiment of the invention concerns a method to effect translational motional comprising the steps of applying harmonic or periodic vibration to an object, exciting modes of vibration in a surface, and directing the translational motion of the object by using symmetry breaking elements. The present invention specifically discloses types of vibration sources, types of vibrating surfaces, and types of antisymmetry elements.

Other embodiments of the present invention include methods to effect translational motion from traveling waves, translational motion from standing waves, wall climbing motion, directional control using vibrating surfaces ("focusing surfaces") which interact with obstacles, and directional control using eigenmodes.

DETAILED DESCRIPTION OF THE INVENTION

Figure 1:
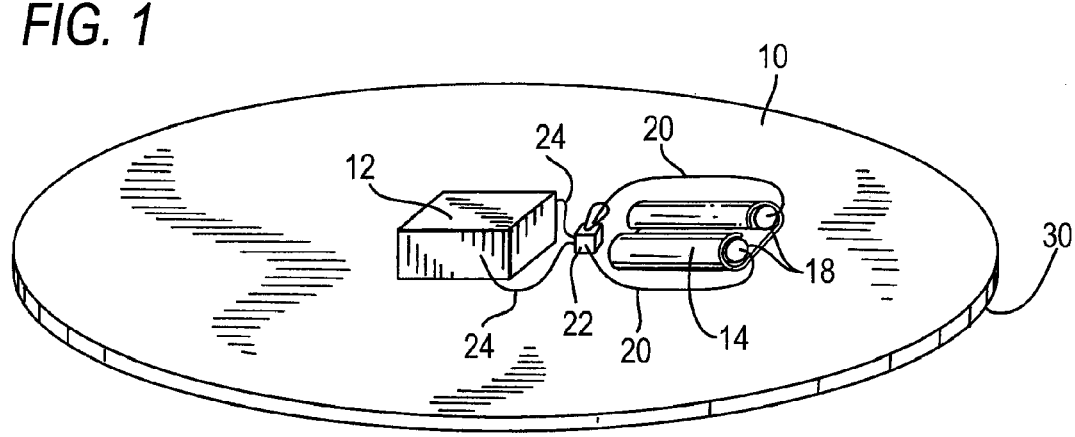
FIG. 1 is a plan view of one embodiment of the invention.

In general, the present invention represents a novel approach to effect translational motion by application of vibrations. More particularly, aspects of the invention are directed to a device to effect such motion and a method to produce such motion.

A device according to the invention employs vibratory motion emanating from the device itself, to effect translational motion. Such a device comprises a source of harmonic or periodic mechanical or acoustic vibrations. This vibration source must be energetic enough to produce amplitudes of vibration which can actually cause movement of the device. Suitable vibration sources include, for example, the following:

(1) an electric motor which is fitted with an eccentric cam. A preferred aspect of a motor which rotates an eccentric weighted cam is that traveling waves can be produced, since the motor-cam combination tends to produce a rotating or twisting motion in addition to an up-down and side to side motion;

(2) an electromechanical buzzer consisting of an electromagnet and a springy steel vibrating reed. Such devices are preferred for producing standing waves;

(3) an electromagnetic audio speaker;

(4) a piezoelectric speaker or bending element; and (5) a gas under pressure escaping from a nozzle, which is used to vibrate a reed or drive some sort of oscillating device such as a piston-cylinder combination. If the source of the gas is some sort of combustion process, then it is possible to obtain a much greater power to weight ratio than is possible with battery powered motors. Another method of obtaining gas under pressure would be to exploit a phase change of a particular substance, e.g., the change of solid $CO_2$ ("dry ice") into a gas at room temperature. Yet another means of obtaining a gas under pressure would be some sort of chemical reaction, e.g., the breakdown of acetic acid and sodium bicarbonate into $CO_2$ (gas) and water.

A device according to the invention comprises a vibratable or vibrating substrate whose modes of vibration are excited by the source of vibrations. The vibrating substrate needs the correct stiffness (modulus of elasticity) and mass density to vibrate. It will also need to have the correct size and shape so that its normal modes of vibration can result in forward, left, and right motion of the device. Size and shape of the device are selected to optimize outcome. Typical shapes include circular, rectangular, oval, and square, circular being preferred. It has been found empirically that plates with these shapes have normal modes of vibration which lend themselves to forward motion with the ability to be directed to the right or to the left as desired. Some particular embodiments are a thin plastic sheet, a thin brass sheet, and a thin Styrofoam sheet, having a thickness from about 0.02 to about 0.20 inches thick, preferably from about 0.05 to about 0.15 inches thick. In a preferred embodiment of the invention the sustrate will be flat or substantially flat where the surface of the substrate facing a horizontal, slanted, or vertical surface may have a slightly angled outer periphery or "lip", which will extend all, or substantially all, the way around the outer periphery of the substrate.

Preferably a device according to the invention comprises an "antisymmetry element" (or symmetry breaking element) which will break the symmetry of the vibrating motion relative to the ground and thereby produce a net translational movement. This antisymmetry element can be an arrangement of projections or bristles situated at an angle to the vibrating surface which functions to break the symmetry of the vibrating motion relative to the ground and thus produce a net translational movement. The antisymmetry elements are, in general, at an angle to the vibrating surface, which angle will preferably be other than perpendicular to the vibrating surface. The elements may consist of bristles, semi-stiff pins, bumps, or any textured projection. The purpose of these antisymmetry elements is to convert the symmetrical standing waves of the vibrating surface into propulsive movements of the device. Specific examples of such embodiments include, for example, flexible brush bristles, which are curved backward; small spines or spicules embedded in a flexible matrix; fins; and a conformable mat.

In addition to providing translational movement, the antisymmetry element contributes to a control mechanism whereby changing the frequency of the harmonic vibratory motion will cause direction of the device to change. In addition, in other embodiments of the invention, the vibrating surface may be segmented and/or there could be more than one source of vibratory energy, so that there could be translational movement as well as directional control.

There are at least five distinct aspects to the invention:

Translational Motion from Travelling Waves

Traveling waves, which are produced in the vibrating surface, can obviously produce translational motion as these waves progress from one end of the device to the other end. By alteration of the direction of these traveling waves, steering or directional control can be produced.

Translational Motion from Standing Waves

Vibrations or waves in a solid or liquid medium can be either standing waves or travelling waves. From everyday experience one knows that traveling waves, such as ocean waves, can be used to propel objects such as, for example, boats or surfers. Standing waves, however, produce only repetitive motion, which does not result in any net displacement of material, or translational motion. An example of this would be the standing waves produced on the string of a musical instrument. If a standing wave is made to impinge on the ground, there would be no net motion in any direction since the displacements of the wave tending to produce motion in one direction would be cancelled out in the next half cycle by the return motion of the wave in the opposite direction. However, it is possible to use standing waves to effect net translational motion if the waves can be coupled to the ground in antisymmetric way so that a force in one direction Directional Control using Vibrating Surfaces ("Focusing Surfaces") which Interact with Obstacles The essential understanding here is that focusing surfaces which are concave relative to the obstacle encountered will tend to steer the device toward the obstacle, while focusing surfaces which are convex focusing surfaces tend to steer the device away from the obstacle. This steering ability is enhanced by the vibrating nature of the basic motion of the device, as the vibrations tend to re-align the device toward (or away) from the obstacle.

Directional Control Using Eigenmodes

Directional control can be achieved by using certain normal modes of the vibrating surface. The best combination of normal modes to produce the ability to turn left or right would be two modes which are mirror images of one another and which are asymmetric around the longitudinal axis of the vibrating surface. When the vibrating surface is equipped with appropriate antisymmetry elements, the device will turn either to the left or to the right depending on which normal mode is active. A normal mode ("eigenmode") can be selected by vibrating the surface at the specific frequency corresponding to that mode ("eigenfrequency"). The fact that there is a one to one correspondence between each eigenfrequency and each normal mode is known from the physics of wave motions and the solutions of the wave equation.

Embodiments within the scope of the invention include:

(1) a device which propels itself by means of its own vibratory motion;

(2) a device which can move on a flat surface;

(3) a device which can move on a channeled surface; during one part of the wave cycle that is not counterbalanced by an equal and opposite force in the other direction during the next part of the cycle. This asymmetry is produced by the antisymmetry elements on the vibrating surface, which are at an angle to the surface.

This translational motion may be used to propel the device on a flat surface (one surface of contact between device and substrate), in a walled channel without a roof (three surfaces of contact), in a hollow tube (contact on all lateral surfaces), and in liquids either on the surface or submerged.

Wall Climbing Motion

Certain standing waves, particularly those with circular symmetry, can produce a suction or vacuum effect as the vibrating surface is lifted away from the surface during one part of the vibratory cycle and slightly pushed into the surface during another part of the cycle. When the surface is being accelerated towards the wall, a slight positive pressure is produced under the plate, which is more than overcome by the inertial forces, which are pressing the plate against the wall. The motion of the plate relative toward the wall may also simultaneously produce some net translational motion. In the next part of the cycle when the plate is being accelerated away from the wall, a vacuum is produced under the plate, which tends to hold it to the wall but now the inertial force tends to pull the plate away from the wall. A new wall holding effect depends on the correct balance between the vacuum producing part of the cycle with the inertial forces, which try to remove the plate from contact with the wall. If the motion when the plate is being accelerated away from the wall is not too violent, there will be production of a vacuum between the plate and the wall, which will more than compensate for the inertial force, which tends to throw the plate away from the wall.

(4) a device which can move by adhering to a wall or other vertical or slanted surface;

(5) a device which can move by adhering to a ceiling or other horizontal surface;

(6) a device which uses a vibrational source to create standing waves in the device;

(7) a device which uses a vibrational source to create traveling waves in the device;

(8) a device which uses "antisymmetry" texturing of the vibrating surface to effect translational motion from standing waves; and (9) a device which can use a balance of inertial and suction forces to adhere to a wall or ceiling and also translate (move) along that wall or ceiling.

In another embodiment of the invention, the vibration-producing element of the device comprises an electromechanical buzzer, a rotating eccentric cam on an electric motor, an escaping gas which vibrates a reed, an element which produces standing waves in the device, an element which produces traveling waves in the device, a device wherein standing (stationary) waves can produce translational motion by means of elements at an angle to the vibrating surface of the device, or a combination of two or more thereof, or the functional equivalent of one or more thereof.

Antisymmetry elements, as discussed above, produce a net force in one direction when averaged over the entire vibratory cycle. Such elements may be, for example, bristles, periodic elevations, regular or irregular projections, or conformable surfaces.

A device according to the invention can be controlled or steered by means of special surfaces called "focussing surfaces", by means of varying the frequency of vibration to select a particular eigenmode, by means of selective damping of the vibrating plate at a nodal line of a desired eigenmode in the case of a standing wave vibrational-source, by changing the direction of rotation of the vibrating device in the case of traveling waves.

The invention can perhaps be better appreciated by making reference to the drawings. FIG. 1 represents an embodiment of the invention which comprises a circular substrate 10 having a source of vibratory harmonic motion or motor 12 centered thereon. Adjacent motor 12 is a battery holder 14 containing two AA batteries 18. Two wires 20 lead from battery holder 14 to a switch 22, which switch 22 is electrically connected through wires 24 to motor 12. Activating switch 22 closes the electrical circuit comprising batteries 18 and motor 12 and causes motor 12 to vibrate.

Motor 12 can comprise any known or future source for imparting vibrational energy, to cause harmonic motion. Motor 12 has to be sufficiently small and efficient to impart vibrational energy but not weigh too much that it negates the vibrational effect or causes the device to slide or fall off a non-horizontal surface. A representative motor 12 is a commercially available pager motor, which provides vibration in the frequency of from about 5 to 20 cycles per second.

Substrate 10 should be a flexible but rigid surface that can vibrate in response to the vibrations from motor 12. Typical materials useful for substrate 10 include polymers, metal, ceramics, and the like. Substrate 10 should be thick enough to support motor 12 but thin enough to vibrate.

Substrate 10 can be of almost any shape or size, dependent upon the strength or power of motor 12. The weight of motor 12 plus the batteries would also be a factor. The bottom surface 30 of substrate 10 is preferably substantially flat, although a slightly concave or pie-plate or FRISBE-shape surface will work as well.

Figure 2:
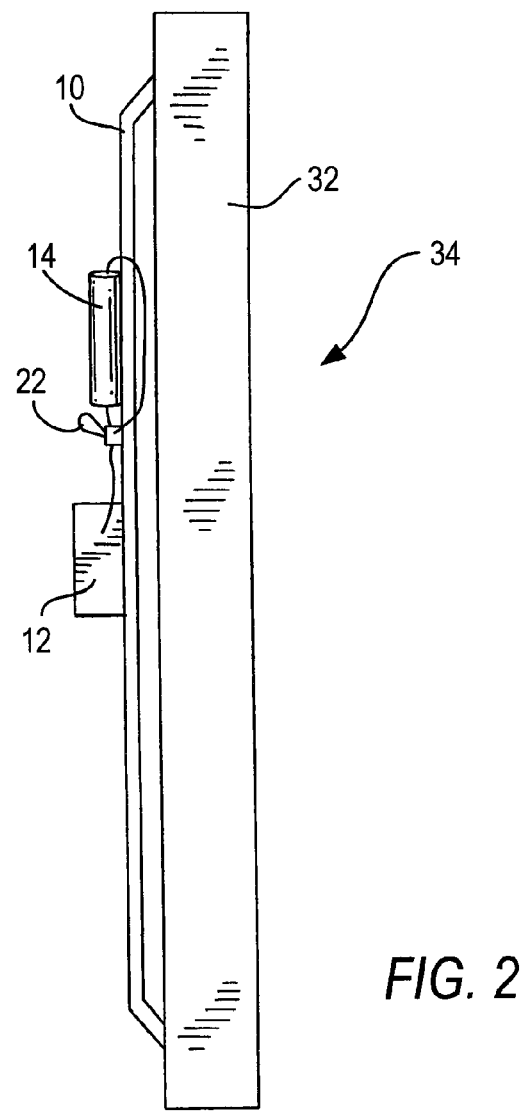
FIG. 2 is a perspective view of an embodiment of the invention on a vertical surface.

FIG. 2 is a cross-sectional view of the device shown in FIG. 1 in position on a vertical surface 32. With the motor 12 activated, the device 34 will either remain in approximately one position, or it may slowly move in a direction along surface 32. If an external lateral force is applied to motor 12 or substrate 10, device 34 will tend to go in that direction. Also, device 34 may be configured as discussed above so that vibratory action may result in directional control.

Figure 3:
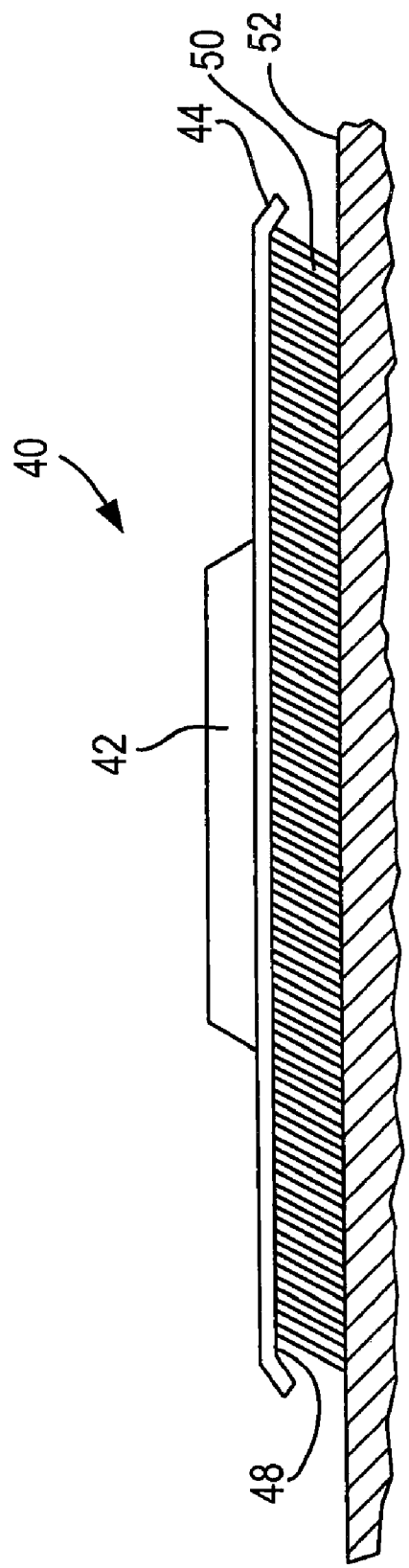
FIG. 3 is a schematic cross-sectional view of an embodiment of the invention having a distinct antisymmetry element.

FIG. 3 is a schematic view of an embodiment of the invention where the device 40 comprises a housing 42 containing a vibrational energy source (not shown specifically) and a power supply (not shown specifically), such as one or more batteries, and a substrate 44. Extending from the lower surface 48 of substrate 44 are bristles 50, which are shown at an angle of about 30° from normal to horizontal surface 52. Preferably bristles such as bristles 50 will be from about 45 to 85° from normal. Optionally bristles 50 could be slightly curved and are preferably comprised of a suitable flexible polymeric material.

EXAMPLES

Example 1

The device comprises a Styrofoam pie plate (9 inches in diameter, of central depth ¾ inch, with an edge at the circumference of width approximately one-half inch), an electrical motor with an eccentric weight, and 2 Ni—Cd batteries (AAA size). The motor and batteries are placed on the underside of the pie plate.

In one use, the device, with the pie plate upside down, translated with the circumferential edge in contact with a surface. This device translated in a vertical direction along a wall, in an embodiment termed "wall crawling pie plate."

In another use, the motor and batteries can be placed in an enclosure, such as a film can. The device, with the pie plate upside down, translated with the circumferential edge in contact with a surface. Specifically, the device can translate along a surface, such as a porcelain tub surface, underneath water.

Example 2

The device comprises an approximately flat 3 inch diameter, approximately 1 mm thick, circle or approximate circle of material (which can be cut, for example, from the bottom of the 9" diameter Styrofoam pie plate), a pager motor, and a power source. The power source can be wires connected to the motor which lead to a battery remote from the 3 inch diameter circle.

On energizing the motor and creating vibrations, the device translated along a surface.

Example 3

The device comprises a ping pong ball with a hole, a motor, and a power source. The motor and power source can be placed within the ping pong ball. On energizing the motor and creating vibrations, the device spins when placed in a cup of water. It is believed that this is through rotational traveling waves.

Example 4

The device comprises a foam wheel with a motor and a power source. On energizing the motor and creating vibrations, the foam wheel revolved.

Example 5

The device comprises a piece of scrub brush with a motor and a power source. The motor is attached to the portion of the scrub brush opposite the bristles. On energizing the motor and creating vibrations, the scrub brush moved forward.

Example 6

The device comprises a motor, potted in a container, with a power source or leads to a power source, wherein bristles are attached to the scrub brush. This device climbed vertically in a cardboard tube even carrying its own battery.

Example 7

The device comprises a motor with a power supply, a brass sheet, and bristles attached to the brass sheet on the side opposite to the side with the motor. Depending on the frequency of the motor, the device, when placed on a surface, turned left, turned right, or went straight ahead. The bristles are used to break symmetry.

The preceding specific embodiments are illustrative of the practice of the invention. It is to be understood, however, that other expedients known to those skilled in the art or disclosed herein, may be employed without departing from the spirit of the invention or the scope of the appended claims.

What is claimed is:

1. A device comprising:
    a flexible substrate having at least one substantially flat surface; and
    at least one source of vibrational energy attached to or in communication with at least one of the at least one substantially flat surface to apply vibrational energy to the flexible substrate,
    wherein the vibrational energy causes periodic motion in the flexible substrate to cause the device to adhere to an exterior surface and the device is capable of translational motion along the exterior surface.

2. The device of claim 1, wherein the vibrational energy is harmonic.

3. The device of claim 2, wherein the vibrational energy causes the flexible substrate to flex in a harmonic fashion.

4. The device of claim 2, wherein at least one of the at least one source of vibrational energy imparts vibrations to said substrate to cause said substrate to move in a translational fashion.

5. The device of claim 1, wherein the exterior surface is other than horizontal.

6. The device of claim 5, wherein the exterior surface is vertical.

7. The device of claim 5, wherein the exterior surface is upside down.

8. The device of claim 1, wherein a change in frequency of the vibrational energy causes the direction of the motion of the device to change.

9. The device of claim 1, wherein the flexible substrate has a point of asymmetry.

10. The device of claim 1, wherein the flexible substrate has first and second substantially parallel planar surfaces.

11. The device of claim 1, wherein the flexible substrate is circular, rectangular, oval, square, or hemispherical.

12. A device capable of translational motion comprising:
   a flexible substrate having at least one substantially flat surface; and
   at least one source of harmonic vibration attached to or in communication with at least one of the at least one substantially flat surface to apply vibrational energy to the flexible substrate,
   wherein the harmonic vibration causes periodic motion in the flexible substrate to cause the device to adhere to an exterior surface and the device is capable of translational motion along the exterior surface.

13. The device of claim 12, wherein at least one of the at least one source of harmonic vibration imparts vibrations to said substrate to cause said substrate to move in a translational fashion.

14. The device of claim 12, wherein the exterior surface is other than horizontal.

15. The device of claim 14, wherein the exterior surface is vertical.

16. The device of claim 14, wherein the exterior surface is upside down.

17. The device of claim 12, wherein at least one of the at least one source of harmonic vibration is attached to the flexible substrate.

18. The device of claim 1 or 12 which also comprises an asymmetry element.

19. The device of claim 18, wherein the asymmetry element comprises bristles, spines or spicules embedded in a flexible matrix, regular or irregular projections, fins, or a conformable mat.

20. The device of claim 19, wherein the asymmetry element comprises bristles.

21. The device of claim 12, wherein the flexible substrate has first and second substantially parallel planar surfaces.

22. The device of claim 12, wherein the flexible substrate is circular, rectangular, oval, square, or hemispherical.

* * * * *